United States Patent Office 3,519,627
Patented July 7, 1970

3,519,627
CARBOXYL-CONTAINING ETHERS OF AMINO-TRIAZINE/ALDEHYDE CONDENSATES
Carlton E. Coats, Burnsville, Minn., and John David Nordstrom, Westland, Mich., assignors to Ashland Oil & Refining Company, Houston, Tex., a corporation of Kentucky
No Drawing. Filed Apr. 9, 1968, Ser. No. 719,854
Int. Cl. C07d 55/32
U.S. Cl. 260—249.6
5 Claims

ABSTRACT OF THE DISCLOSURE

Carboxyl groups are introduced into amino-triazine/aldehyde condensates by (1) transetherifying an alkoxyalkyl amino-triazine with a mono- to di-hydroxy aliphatic carboxylic acid in the presence of an acid catalyst or (2) by etherifying an alkylol amino-triazine with a mixture of aliphatic monoalcohol and a mono- or di-hydroxy aliphatic carboxylic acid in the presence of acid catalyst. The carboxyl-containing ether products have improved water solubility, are useful as cross-linking agents for hydroxyl-, carboxyl- and amide-containing polymers and may be applied electrolytically to conductive articles by placing the article at the anode in an electrolytic cell containing an aqueous solution of the carboxyl-modified condensate.

DISCLOSURE

This invention relates to novel alkoxy alkyl derivatives of amino-triazine/aldehyde condensates and the method of preparing them. More particularly this invention relates to alkoxyalkyl derivatives of amino-triazine/aldehyde condensates in which at least one of the alkoxy groups contains a free carboxyl group.

Alkoxyalkyl amino-triazine/aldehyde condensates are well-known in the art. They may be exemplified by compounds such as tetramethoxymethyl guanamine and hexamethoxymethyl melamine. The latter compound, for instance, is prepared by condensing 6 moles of formaldehyde with 1 mole of melamine to form hexamethylol melamine and subsequently etherifying the product with 6 moles of methyl alcohol to form the hexamethoxymethyl derivative. Compounds of this type are highly desirable coating resins and have the ability to cross-link a variety of hydroxyl, carboxyl and amide containing polymers. They may, for instance, be used to cross-link alkyd resins.

It is desirable for many applications to prepare amino-triazine/aldehyde condensates which have a high degree of water solubility. Amino-triazine/aldehyde condensates which are capable of being applied by electrodeposition processes are also highly desirable. The introduction of a carboxyl group into the amino-triazine/aldehyde condensates in accordance with the method of this invention provides a polymer which exhibits these desirable properties.

Accordingly, it is an object of this invention to prepare carboxyl-modified ethers of amino-triazine/aldehyde condensates.

It is a further object of this invention to prepare amino-triazine/aldehyde condensates which exhibit improved water solubility.

Still another object of this invention is to prepare carboxyl-modified ethers of amino-triazine/aldehyde condensates which may be applied by electrochemical processes.

Still other objects will be apparent from the following disclosure.

The compounds prepared by the method of this invention correspond to the general formula:

(I) 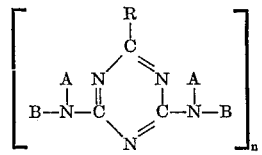

in which $n$ is an integer from 1 to 5; R is hydrogen, phenyl, alkyl having 1 to 18 carbon atoms, and preferably 1 to 4 carbon atoms, cycloalkyl having 3 to 18 carbon atoms and preferably 3 to 8 carbon atoms, or

A is alkyl having 1 to 18 carbon atoms and preferably 1 to 4 carbon atoms, cycloalkyl having 3 to 18 carbon atoms and preferably 3 to 8 carbon atoms, phenyl, or

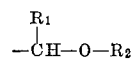

B is

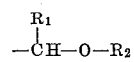

$R_1$ is hydrogen, alkyl having 1 to 18 carbon atoms and preferably 1 to 4 carbon atoms, phenyl or phenyl substituted with alkyl having 1 to 4 carbon atoms; $R_2$ is alkyl having 1 to 8 carbon atoms and preferably 1 to 4 carbon atoms, alkyl or alkenyl having 1 to 7 carbon atoms and substituted with carboxyl, or alkyl or alkenyl having 1 to 7 carbon atoms and substituted with carboxyl and hydroxyl; with the proviso that at least one of said $R_2$ groups contains a carboxyl group and with the further proviso that when $n$ is greater than 1 at least one of said $R_2$ groups is a alkylene or alkylidene radical having 1 to 7 carbon atoms and substituted with carboxyl, bridging two of said triazine units.

It will be noted that the compounds can be "monomers" i.e. comprising one triazine nucleus, or lower molecular weight "polymers" comprising two to five triazine nuclei.

Among the most preferred substituents under the generic description in Formula I above are:
R=methyl, phenyl, methoxymethylamino, bis(methoxymethyl)amino, bis(butoxymethyl)amino;
A=methyl, cyclohexyl, phenyl $$-CH_2O-CH_2-COOH$$

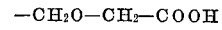

(bridging two triazine nuclei where $n$ is greater than 1);

$$B=-CH_2-O-CH_2-COOH$$

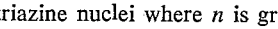

(bridging two triazine nuclei where $n$ is greater than 1).

The amino-triazine/aldehyde condensate starting materials utilized in this invention correspond to the formula:

(II) 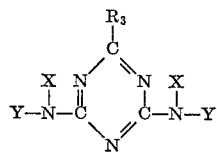

in which $R_3$ is hydrogen, phenyl, alkyl having 1 to 18 carbon atoms and preferably 1 to 4 carbon atoms, cycloalkyl having 3 to 18 carbon atoms and preferably 3 to 8 carbon atoms, or

X is phenyl, alkyl having 1 to 18 carbon atoms and preferably 1 to 4 carbon atoms, cycloalkyl having 3 to 18 carbon atoms and preferably 1 to 4 carbon atoms, or

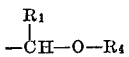

$R_1$ is as defined above in Formula I; and $R_4$ is hydrogen or alkyl having 1 to 8 carbon atoms and preferably 1 to 4 carbon atoms; Y is

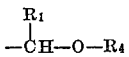

wherein $R_1$ and $R_4$ are as defined above.

The most preferred substituents are those from which the preferred compounds defined in Formula I above are derived.

The amino-triazines from which the above aldehyde condensate starting materials are derived are those with at least two amino groups, each of which has at least one reactive hydrogen atom. They correspond to the following formula (III)

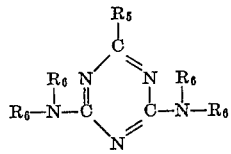

in which $R_5$ is hydrogen, phenyl, alkyl having 1 to 18 carbon atoms and preferably 1 to 4 carbon atoms, cycloalkyl having 3 to 18 carbon atoms and preferably 3 to 8 carbon atoms, or

and $R_6$ is hydrogen, phenyl, alkyl having 1 to 8 carbon atoms and preferably 1 to 4 carbon atoms, or cycloalkyl having 3 to 18 carbon atoms and preferably 3 to 8 carbon atoms; with the proviso that at least one $R_6$ on each substituted amino nitrogen is hydrogen.

Examples of suitable triazines under the generic Formula III above are melamine, benzoguanamine, formoguanamine, acetoguanamine, N-substituted melamines and N-substituted guanamines. Melamine is particularly preferred because of economics and availability. The aldehydes which may be reacted with the amino triazines to form the alkylolated amino-triazines include saturated aliphatic aldehydes having 1 to 8 carbon atoms such as formaldehyde, acetaldehyde, propionaldehyde and tetrahydrobenzaldehyde; and aromatic aldehydes having 7 to 11 carbon atoms such as benzaldehyde. The preferred aldehyde is formaldehyde because of its reactivity and economic considerations.

In one embodiment of the present invention, alkylolated amino-triazines are used as starting materials. It is preferred that they be highly alkylolated, e.g., completely alkylolated materials such as hexamethylolmelamine, tetramethylol guanamine, and the like. In another aspect of the invention, the starting materials are alkoxyalkyl amino-triazines. It is preferred that these be highly etherified materials such as hexamethoxymethyl melamine, tetramethoxymethyl guanamine, and the like. These starting materials are derived from the etherification of alkylolated amino-triazines with alkyl monoalcohols having 1 to 8 and preferably 1 to 4 carbon atoms, such as methyl, ethyl, propyl, butyl and octyl alcohols. Methyl alcohol is most preferred because of cost and reactivity.

It is preferred that all of the $R_4$ groups in the above Formula II be identical, that is, either hydrogen or alkyl. In one case, the starting compound would be an alkylol amino-triazine; in another case, the starting material would be an alkoxyalkyl amino-triazine. In the first instance, where an alkylol amino-triazine is the starting material, the reaction with a carboxyl containing mono- or di-alcohol is a conventional etherification reaction. In the second instance, where the starting material is an alkoxyalkyl amino-triazine, the reaction with a carboxyl-containing mono- or di-alcohol is a transetherification reaction.

The etherification or transetherification reaction is conducted at a temperature 25–150° C. preferably 65–100° C., preferably in the presence of a strongly acid catalyst. The reaction can proceed to a degree without catalyst but this is not preferred. Concentration of the catalyst can range from 0.01 mole percent to 5 mole percent, a preferred range being 0.1 to 2.0 percent. This reaction can be conducted with no added solvent, if desired, or in the presence of alcoholic solvents.

In transetherification, it is expected that an alcoholic solvent would enter into the transetherification reaction of the amino-triazine as well as the hydroxy acid. For this reason, the solvent is most conveniently the same alcohol which was originally used to etherify the alkylol amino resin.

In etherification, it is expected that the alcoholic solvent and the hydroxy acid will enter into the etherification reaction in about the proportions which they are present in the reaection mixture. For this reason, it is preferred that the proportions correspond to the proportion of the hydroxy acid desired in the final product. In either the case of etherification or transetherification, where a solvent is used it is preferred to use only enough to make the reaction mixture fluid and easily worked.

The strongly acid catalysts useful in etherification or transetherification are the mineral acids such as hydrochloric acid, sulfuric acid, and organic acids such as p-toluene sulfonic acid, trichloroacetic acid, sulfamic acid and oxalic acid. Preferred acids include sulfuric acid, hydrochloric acid, and p-toluene sulfonic acid.

As mentioned previously, the hydroxy acid which enters into the etherification or transetherification reaction may contain 1 or 2 hydroxy groups. Generally, these acids are hydroxy-monocarboxylic acids having 2 to 8 carbon atoms. Examples of monohydroxy monocarboxylic acids which may be used in this invention are glycolic acid (hydroxyacetic), lactic acid, alpha-hydroxyisobuteric acid and 6-hydroxyenanthic acid. Glycolic acid is particularly preferred because of its availability, economics and reactivity. Among the dihydroxy acids may be mentioned 2,2-dimethylolpropionic acid (which is preferred), dimethylolbutyric acid and dimethylol valeric acid.

Salts can be formed from the carboxyl-modified amino-triazine condensates by the reaction with amines, alkali metal hydroxides or alkaline earth metal hydroxides. Examples of suitable salt-forming hydroxides include sodium hydroxide, potassium hydroxide, and calcium hydroxide. Generally, any of the lower alkyl or lower alkanol amines may be used as the salt-forming amines. Examples include methyl amine, ethyl amine, dimethyl amine, diethyl amine, triethyl amine, ethanolamine, and dimethylethanol amine.

The carboxyl-modified ethers of amino-triazine/aldehyde condensates prepared by the methods of this invention are generally useful in any application where the unmodified amino-triazine/aldehyde ethers were previously used. One such application is in coating and paint compositions as a cross-linking resin for another carboxyl-, hydroxyl-, or amide-containing resin. Examples of such cross-linkable resins include alkyds and free carboxyl-containing acrylic and methacrylic resins.

The carboxyl-modified condensates of this invention and their salts find particular utility where good water solubility is necessary or desirable. Another particularly valuable use is in coating compositions intended to be applied by electrolytic methods. These coating methods are well-known in the art and are exemplified in U.S. Pat. 3,230,162 to Gilchrist. In general, an electrically conductive article to be coated is connected to the anode of an electrolytic cell containing the resin of this invention in solution as an electrolyte. The cell is maintained at a potential of about 10 volts to 500 volts for a period of .1 to 10 minutes until a sufficient film build up has been achieved. The article is then dried. The introduction of the carboxyl group in the condensates of this invention greatly increases their anode affinity and therefore their utility in electrolytic coating applications.

The invention is illustrated by reference to the following examples. All parts and percentages are by weight unless otherwise indicated. These examples are illustrative of certain embodiments designed to teach those skilled in the art how to practice the invention and to represent the best mode contemplated for carrying out the invention and are not intended to limit the scope of the invention in any way.

EXAMPLE 1

This example illustrates the preparation of a carboxyl-containing amino-triazine/aldehyde condensate by trans-etherification of an alkoxyalkyl amino-triazine/aldehyde with a monohydroxy carboxylic acid.

A solution of 60% glycolic acid in water was refluxed with two times its weight of benzene to remove the water. The benzene was then removed by low pressure distillation. The product (76 gr., 1.0 mole) was placed in a 500 ml. flask with 390 grams of Cymel 301 (hexamethoxymethyl melamine) and 4.8 grams of concentrated hydrochloric acid. The mixture was stirred and heated at 90° C. for five hours. Triethylamine (33 grams) and methyl Cellosolve (ethylene glycol monomethyl ether) (200 grams) were added after the reaction was cooled to room temperature. The resulting composition had a pH of 8.5.

EXAMPLE 2

This example illustrates the cross-linking of an alkyd with a carboxyl-modified amino-triazine/aldehyde condensate.

A blend of 85 parts (solid basis) of Aroplaz 2580 (a non-oxidizing alkyd) and 15 parts of the reaction product of Example I (solids basis) was prepared and adjusted to 50% non-volatile with xylene. A 3-mil film of this blend was baked at 250° F. for 30 minutes. The resulting clear film had a Sward hardness of 16 and was only swollen after ten minute contact with xylene. A similar mixture of Aroplaz 2580 and unmodified Cymel 301 gave a film of 10 Sward hardness which was dissolved by 10 minutes contact with xylene.

EXAMPLE 3

This example illustrates the preparation of a carboxyl-modified amino-triazine/aldehyde condensate by trans-etherification of an alkoxy alkyl amino-triazine/aldehyde condensate with a di-hydroxy carboxylic acid.

Cymel 301 (hexamethoxymethyl melamine) (195 grams) and dimethylol propionic acid (67 grams) were charged to a 500 ml. 3 neck flask fitted with a stirrer, thermometer and condenser. The mixture was stirred and heated at 50° C. until a good dispersion was obtained. Methanol (29 grams) and p-toluene sulfonic acid (2.6 grams) were then added to the flask and the reaction temperature raised until reflux occurred (83° C.). The reaction was refluxed for seven hours. Upon cooling to 60° C., dimethylethanolamine (46 grams) was added.

The final resinous product had a pH of 8.1, and acid number of 79 and a percent non-volatile content of 74.6.

EXAMPLE 4

This example illustrates the use of carboxyl-modified amino-triazine/aldehyde condensates in electrolytic coating applications.

The resin prepared in Example 3 was placed in an electrocoating bath with a hydroxyl- and carboxyl-functional acrylic resin (made from 40 parts by weight styrene, 40 parts by weight acrylic acid ester of 2-ethylhexanol, 10 parts by weight acrylic acid, and 10 parts by weight hydroxypropylmethacrylate) so that the ratio of acrylic solids to amino resin solids was four to one and the total non-volatile content of the bath was six percent. Metal panels were plated for one minute with 50 v. potential, rinsed, blown dry and baked for 20 minutes at 350° F. A film of 0.4 mil resulted which was very hard and solvent resistant. A similar plating operation with unmodified amino resin in the bath gave a poor, soft, solvent soluble film after baking.

What is claimed is:

1. A compound having the formula (I) 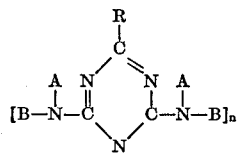

in which $n$ is an integer from 1 to 2; R is hydrogen, phenyl, alkyl having 1 to 18 carbon atoms, cycloalkyl having 3 to 18 carbon atoms, or

A is alkyl having 1 to 18 carbon atoms, cycloalkyl having 3 to 18 carbon atoms, phenyl, or

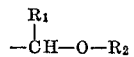

B is

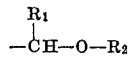

$R_1$ is hydrogen, alkyl having 1 to 18 carbon atoms, phenyl or phenyl substituted with alkyl having 1 to 4 carbon atoms; $R_2$ is alkyl having 1 to 18 carbon atoms, alkyl or alkenyl having 1 to 7 carbon atoms and substituted with carboxyl, or alkyl or alkenyl having 1 to 7 carbon atoms and substituted with carboxyl and hydroxyl; with the proviso that at least one of said $R_2$ groups contains a carboxyl group and with the further proviso that when $n$ is 2 one of said $R_2$ groups is an alkylene radical having 1 to 7 carbon atoms and substituted with carboxyl, bridging the two triazine units.

2. The compound of claim 1 in which R is

3. The compound of claim 2 in which $R_1$ is H.
4. The compound of claim 3 in which each A is

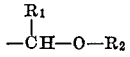

and one of said $R_2$ groups —CH$_2$—COOH the remaining $R_2$ groups being methyl.

5. The compound of claim 3 comprising 2 of said triazine units, in which each of said A groups are

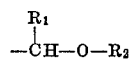

at least one of said $R_2$ groups is

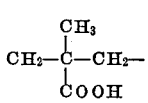

bridging a pair of said triazine units, and the remaining of said $R_2$ groups are methyl.

References Cited

UNITED STATES PATENTS 3,091,612   5/1963   Stephens _____ 260—249.9

(Other references on following page)

UNITED STATES PATENTS

| | | | |
|---|---|---|---|
| 3,145,207 | 8/1964 | Wohnsiedler | 260—249.6 |
| 3,244,713 | 4/1966 | Dowbenko et al. | 260—249.9 |
| 3,278,253 | 10/1966 | Weckler et al. | 260—249.6 XR |
| 3,352,838 | 11/1967 | Toepfl et al. | 260—249.6 XR |
| 3,465,036 | 9/1969 | Dundon | 260—249.6 XR |

HENRY R. JILES, Primary Examiner

J. M. FORD, Assistant Examiner

U.S. Cl. X.R.

260—249.9, 240, 67.7, 75, 76, 77, 78, 78.4; 117—230; 204—181

Notice of Adverse Decision in Interference

In Interference No. 97,818, involving Patent No. 3,519,627, C. E. Coats and J. D. Nordstrom, CARBOXYL-CONTAINING ETHERS OF AMINO-TRIAZINE/ALDEHYDE CONDENSATES, final judgment adverse to the patentees was rendered Jan. 17, 1975, as to claims 1, 2, 3, 4 and 5.

[*Official Gazette August 5, 1975.*]